Sept. 15, 1959     O. MITCHELL     2,903,749
COTTON CLEANING MACHINE
Filed March 8, 1952
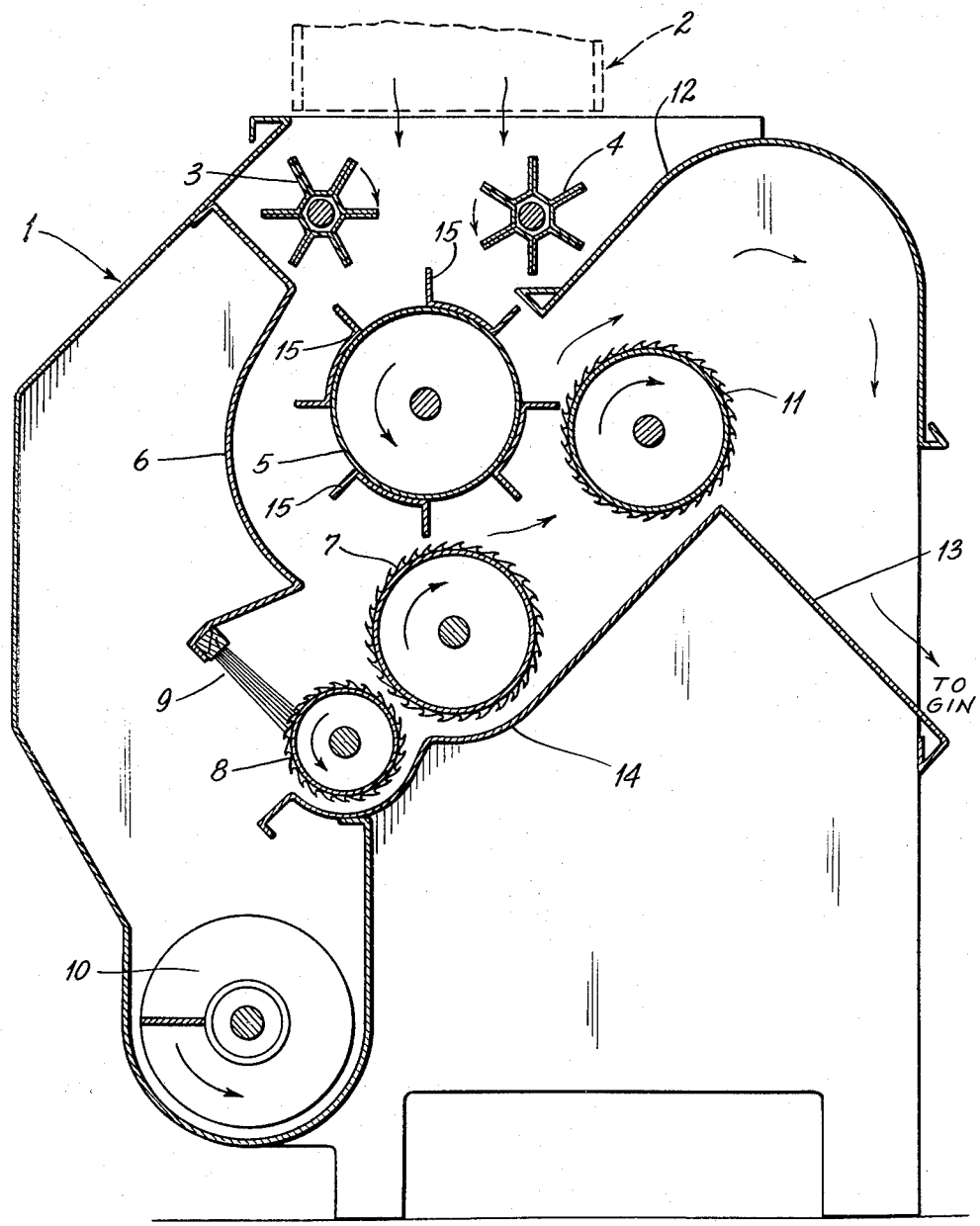
INVENTOR:
ORVILLE MITCHELL
BY Kingsland, Rogers & Ezell
ATTORNEYS

2,903,749

COTTON CLEANING MACHINE

Orville Mitchell, Dallas, Tex., assignor to John E. Mitchell Company, Dallas, Tex., a corporation of Missouri Application March 8, 1952, Serial No. 275,525

12 Claims. (Cl. 19—35)

This invention relates to a cotton cleaning machine, and in particular, is drawn to a novel apparatus for separating cotton fibers from cotton hulls and any trash which may be associated with it.

In recent years, it has become a widespread practice to harvest cotton mechanically in order to save time and labor and thereby decrease the cost of gathering the cotton from the cotton plants. In such an operation, the cotton hulls will be harvested as well as associated twigs, leaves and other trash, and for ginning it is necessary to clean the cotton and remove the hulls and trash. It has been conventional in the past to accomplish this cleaning by means of a plurality of extracting cylinders and reclaiming cylinders associated with doffing cylinders so as to separate the hulls and trash from the cotton, and a typical machine for carrying out this function has been disclosed by John E. Mitchell in Patent No. 2,100,303.

It is a conventional practice to place the cotton cleaning machine directly in front of the gin in the gin plant, and the machines used in the past have been subject to the objection of being too bulky and space consuming. Further, the equipment necessarily required in the past has been complicated and provided with a multiplicity of intricate operating elements requiring constant maintenance and supervision.

The present invention provides a machine for cleaning and extracting cotton from hulls and associated trash by means of an exceptionally advantageous integrated arrangement of the doffer cylinder with the extracting cylinder and the cleaning cylinder, in such a relationship, that a minimum of space is required while cleaning with an optimum degree of efficiency. By means of the special integration of the elements of the machine obtained through the teaching of this invention, it is made possible to employ a single doffing cylinder in such a manner that it can be employed to charge the raw cotton through the cleaning machine, direct the cotton onto one of the extracting saw cylinders, doff it from this extracting saw cylinder and direct it onto a secondary extracting saw cylinder and both doff the cleaned cotton from the secondary extracting saw cylinder and expel the cleaned cotton outwardly from the cotton cleaning machine so as to be ready to be charged to the ginning machine or any associated apparatus.

Accordingly, it is an object of this invention to provide a cotton cleaning machine which operates at an increased efficiency and a minimum of space with simple and rugged design characteristics.

It is a further object of this invention to provide a cotton cleaning machine having a minimum number of doffing cylinders and extracting saw cylinders arranged in an integral relationship, such that the cotton cleaning operations involved are decreased and the cleaning efficiency increased.

A still further object of this invention resides in so arranging the doffing cylinder and extracting saw cylinders in such a manner that there are a minimum number of moving parts, whereby the operation of the machine is greatly simplified.

Yet, another object of this invention is to so arrange the doffing cylinder in integrated relationship with a plurality of extracting saw cylinders, that the doffing cylinder charges the raw cotton into the cylinders in sequential operation, and at the same time, doffs the cleaned cotton from the saw cylinders and expels the cotton in clean form away from the saw cylinders.

In order that a more complete description of this invention may be made, reference may be had to the accompanying drawing, illustrating a preferred embodiment of the cotton cleaning machine.

The drawing is a longitudinal sectional view through the machine constructed according to this invention, the conventional driving means being omitted, and the direction of rotation of the various elements and the path of the cotton being indicated by arrows.

The casing of the cotton cleaning machine is indicated generally at 1, and it is provided at the top with an opening through which cotton may be charged from a hopper shown partially at 2. Feed rollers 3 and 4 are adapted to travel at a low rate of speed to withdraw the cotton from the hopper, press it into a bat and press it into contact with the vanes 15 of doffing cylinder 5. The doffing cylinder 5 rotates at a high speed in a counterclockwise direction, throws the cotton against the housing 6 which is of an arcuate figuration so as to cause the cotton to travel directly onto the teeth of the extracting saw cylinder 7 which rotates in a clockwise direction. Cotton hulls and trash such as leaves, twigs and the like that have been loosened and detached from the cotton when the raw cotton has been impinged upon the teeth of cylinder 7 fall upon the reclaimer saw cylinder 8 which rotates in a counterclockwise direction, are carried past the wiper brush 9 and fall to the bottom of the machine and are conveyed away by screw conveyor 10. The teeth of reclaiming saw cylinder 8 move at a slower peripheral speed than the teeth of extracting saw cylinder 7 so that if any locks of cotton fall on cylinder 8, they are brushed securely on the saw teeth of this cylinder by the wiper brush, and instead of being wasted are carried around into contact with the faster moving teeth of the extracting saw cylinder 7 and are thereby reclaimed in a manner to be described below.

Situated above and rearward to cylinder 7 is a secondary extracting cylinder 11 having saw teeth which is adapted to rotate in a clockwise direction and at such a speed that the teeth rotate at a peripheral speed less than that of doffer cylinder 5. Cylinder 11 is located slightly below doffer cylinder 5, such that the vanes 15 of doffer cylinder 5 can doff cotton from secondary extracting cylinder 11 upwardly and off of this cylinder. A baffle plate 12 is located above and between cylinders 5 and 11 and extends upwardly and rearwardly in an arcuate configuration so that the cotton may be hurled along the path of the baffle and then be directed downwardly. Situated below cylinders 8, 7 and 11 is a baffle 14 extending downwardly and toward the front of the machine and adapted to receive the heavier hulls of the cotton plant and trash which are directed into the conveyor 10. The slide 13 extends downwardly and rearwardly, so as to direct the cleaned cotton to the ginning machine (not shown).

In the operation of the cotton cleaning machine, raw cotton is discharged downwardly in the bottom of the hopper 2 and is directed by feed rollers 3 and 4 onto the vanes 15 of the doffing cylinder 5. This vane cylinder causes the cotton to be directed downwardly and against baffle 6 which directs the cotton in a normal direction against the teeth of the extracting cylinder 7. The teeth of saw cylinder 7 engage the fibers of the cotton and carry it upwardly. A substantial portion of the hulls and trash associated therewith falls downwardly onto the teeth of reclaiming saw cylinder 8. A small quantity of cotton may also fall onto the teeth in this operation and will be advanced with the hulls and trash toward the wiper brush 9. The hulls and trash will be carried past the wiper brush and fall into the conveyor 10, but the cotton will be reclaimed by the wiping action of the brush which wipes the cotton securely on the saw teeth from whence it is reclaimed by the more rapidly moving teeth of cylinder 7 to which it is removed. Up to this point the operation is performed in a similar manner to that in Mitchell Patent No. 1,802,614.

Subsequently, according to this invention, partially cleaned cotton on extracting saw cylinder 7 is swept off by the vaned doffing cylinder 5 which is rotating at a higher peripheral speed, and this cylinder not only doffs the cotton from cylinder 7, but also throws it forcibly against the lower side of secondary extracting saw cylinder 11 in the direction of the arrow. The cotton hulls and other trash that are not removed in the primary extracting operation are removed either by falling between the cylinders 7 and 11 before reaching the cylinder 11, or are expelled by the cylinder 11, and in either case, this trash falls downwardly onto baffle 14 from whence it passes to the conveyor 10. Any cotton with it is picked up by the teeth of reclaiming saw cylinder 8. The cotton, which is thrown against the secondary extracting cylinder 11, is also doffed therefrom by means of the doffing cylinder vanes 15 which are rotating at a higher peripheral speed than the teeth on the secondary extracting cylinder.

The cotton which is swept from these teeth by vanes 15, then is directed in the direction of the arrow against baffle 12, whereby the cotton is thrown upwardly and rearwardly and then caused to drop down onto baffle leg 13 from whence it can be directed to the gin. It is further to be noted that in all the operations the cotton moves between elements which are rotating in the same direction though the relative speed may be different. By means of this arrangement, it is possible to separate the cotton from the hulls and trash in a highly efficient manner and prevent any ginning action on the cotton fibers themselves which is a hazard to be avoided in the cotton cleaning operation.

Although I have shown the extracting saw cylinders 7 and 11 in an inclined relationship, it is obvious that they can be otherwise disposed along the periphery of the doffing cylinder 5 such as in a horizontal relationship, although the inclined arrangement shown permits better separation of the hulls and trash due to the gravitational effect.

Further, it is possible to use a series of multiple function integrated doffing cylinders disposed between banks of the extracting cylinders, if an increased efficiency is to be desired, as will be obvious to those skilled in the art.

By means of this invention, it has been made possible to separate the purified cotton from the cotton hulls and other trash with a simplified machine which is of rugged design characteristics and employs a minimum number of doffing and extracting cylinders. Various modifications will be apparent from the above description, and these are included as within the scope of this invention without departing from the spirit thereof, and it is desired therefore that only such limitations shall be placed thereupon as specifically set forth in the attending claims.

What is claimed is:

1. A cotton cleaning machine having two parallel saw cylinders in inclined relation to each other and spaced apart a distance for the passage of cotton hulls and other trash between them, feeder means including a doffing cylinder and a baffle to receive raw cotton and direct the cotton downwardly between said doffing cylinder and the baffle to a first one of said cylinders, said doffing cylinder having its axis located above the axis of the first of the two cylinders and to one side of the other, and being adapted to rotate at a higher peripheral speed than said two saw cylinders, and so positioned as to doff the cotton off the upper portion of the first of said saw cylinders and to direct the cotton therefrom against the lower portion of the second saw cylinder, and to doff the cleaned cotton from the upper portion of said second saw cylinder, and a baffle located above and between the upgoing portions of said doffing cylinder and said second saw cylinder whereby the cotton doffed is caused to be directed away from said doffing cylinder.

2. A cotton cleaning machine having two parallel extracting cylinders in inclined relation to each other and spaced apart a distance for the passage of cotton hulls and other trash between them, a doffing cylinder having its axis located above the axis of the first of the two cylinders and to one side of the second, and adapted to rotate at a higher peripheral speed than said two saw cylinders, cotton directing means including said doffing cylinder for directing said cotton against the first one of said extracting cylinders in conjunction with the operation of said doffing cylinder, said doffing cylinder being so positioned as to doff cotton off the upper portion of the first of said extracting cylinders and to direct the cotton doffed from said first cylinder against the lower portion of the second extracting cylinder, and to doff the cleaned cotton from the upper portion of said second extracting cylinder.

3. A cotton cleaning machine having a rotatable doffing cylinder having elements projecting outwardly therefrom, the cylinder being adapted to receive cotton, a first extracting cylinder located beneath said doffing cylinder and spaced from the projecting elements a minimum distance for the doffing of cotton therefrom, a second extracting cylinder located at one side of said doffing cylinder and spaced from the elements of said doffing cylinder a minimum distance for the doffing of cotton therefrom, a baffle spaced from said doffing cylinder at the side opposed to said second extracting cylinder for confining cotton between it and said doffing cylinder and for guiding the cotton toward said first extracting cylinder when the doffing cylinder is operated, said doffing cylinder being thereby adapted to direct the cotton against said first extracting cylinder and doff it therefrom and sequentially direct the partially cleaned cotton against said second extracting cylinder and doff the cleaned cotton therefrom.

4. A cotton cleaning machine having a doffing cylinder having elements projecting outwardly therefrom, and a pair of saw-tooth-like extracting cylinders, a housing in which the said cylinders are mounted with parallel axes, one extracting cylinder being to one side of and above the other, and spaced from it a sufficient distance to provide a vertical space in which hulls and trash may fall down away from the two cylinders, the doffing cylinder rotating faster than both extracting cylinders, the doffing cylinder being located above the top of one extracting cylinder and beside the other with its axis in substantially horizontal alignment with the axis of the said other extracting cylinder, and having means to doff cotton and hulls and project them laterally from the top of the said one cylinder across the vertical space toward the lower part of the other cylinder, the lower part of the second extracting cylinder being located in the path of the cotton so projected to receive the cotton so doffed, and the space between the extracting cylinders being wide enough to cause the trash to fall out through the vertical space, the doffing cylinder also extending adjacent the periphery of the said other extracting cylinder at a point thereon above the aforesaid lower part and at one side thereof, to doff the lint off the second extractor cylinder.

5. The combination of claim 4, with a baffle extending adjacent the doffing cylinder above the second extracting cylinder to receive cotton doffed from the second extracting cylinder and conduct it away from that cylinder, 6. A cotton cleaning machine having a doffing cylinder having a center part and portions projecting outwardly therefrom, and a plurality of extracting cylinders disposed with their axes in parallel relationship about the periphery of said doffing cylinder and spaced from the projecting portions of the doffing cylinder a minimum distance for the doffing of cotton therefrom, said extracting cylinders being adapted to rotate in an opposite direction to that of said doffing cylinder and at a slower peripheral speed thereto, cotton-feeding means including said doffing cylinder, for directing the raw cotton against the first of the extracting cylinders, the doffing cylinder being also positioned adjacent to the periphery of the first extracting cylinder, as aforesaid, so that it doffs cotton from the first extracting cylinder, and the second extracting cylinder being spaced angularly about the axis of the doffing cylinder a distance to provide a trash receiving space between the two extracting cylinders, but being close enough to receive the cotton doffed from the first extracting cylinder, and the doffing cylinder being also close enough to the second extracting cylinder to doff the cotton therefrom in continuous operation in the direction of rotation of said doffing cylinder.

7. A cotton cleaning machine having a rotatable doffing cylinder having a center part and portions projecting outwardly therefrom, adapted to receive raw cotton from a hopper, a first extracting cylinder located beneath said doffing cylinder and spaced from the projecting portions thereof a minimum distance for the doffing of cotton therefrom, a second extracting cylinder located slightly below and at one side of said doffing cylinder and spaced from the projecting portions of the doffing cylinder a minimum distance for the doffing of cotton therefrom, cotton feeding means including the doffing cylinder to direct the raw cotton against said first extracting cylinder, the doffing cylinder being positioned then to doff it therefrom and sequentially direct the partially cleaned cotton against said second extracting cylinder, and the doffing cylinder being positioned then to doff the cleaned cotton therefrom.

8. The combination of claim 7, with a baffle located adjacent said doffing cylinder and said second extracting cylinder in the path of the cotton doffed from the second cylinder whereby the cotton doffed is caused to be directed away from said doffing cylinder.

9. The combination of claim 7, with a baffle extending beneath said first and second extracting cylinders and a reclaiming cylinder, said reclaiming cylinder being located beneath said first extracting cylinder and in advance of its direction of rotation and spaced therefrom a minimum distance for the passage of cotton hulls and other trash, and a wiper brush having its end contacting said reclaiming cylinder whereby loose cotton falling on said reclaiming cylinder is wiped onto said reclaiming cylinder and said reclaiming cylinder rotating at a peripheral speed less than that of said first extracting cylinder whereby said wiped cotton may be transferred to it.

10. A cotton cleaning machine having a doffing cylinder having elements projecting outwardly therefrom, and a pair of saw-tooth-like extracting cylinders, a housing in which the said cylinders are mounted with parallel axes, one extracting cylinder being to one side of the other, and spaced from it a sufficient distance to provide a vertical space in which hulls and trash may fall down away from the two cylinders, the doffing cylinder rotating faster than both extracting cylinders, the doffing cylinder being located adjacent one extracting cylinder and having means to doff cotton and hulls and project them laterally from the cylinder across the vertical space toward the other cylinder, the lower part of the second extracting cylinder being located in the path of the cotton so projected to receive the cotton so doffed, and the space between the extracting cylinders being wide enough to cause the trash to fall out through the vertical space, the doffing cylinder also extending adjacent the periphery of the other extracting cylinder at a point thereon above the aforesaid lower part thereof, to doff the lint off the second extractor cylinder, feeding means in the housing to direct cotton to the doffing cylinder, and means associated with the doffing cylinder to cooperate with that cylinder to separate some hulls from the infeeding cotton and charge the remaining cotton to the periphery of the first extracting cylinder; and means to receive the hulls and trash.

11. A cotton cleaning machine having a doffing cylinder having elements projecting outwardly therefrom, and a pair of saw-tooth-like extracting cylinders, a housing in which the said cylinders are mounted with parallel axes, one extracting cylinder being to one side of the other, and spaced from it a sufficient distance to provide a vertical space in which hulls and trash may fall down away from the two cylinders, the doffing cylinder rotating faster than both extracting cylinders, the doffing cylinder being located adjacent one extracting cylinder and having means to doff cotton and hulls and project them laterally from the cylinder across the vertical space toward the other cylinder, the lower part of the second extracting cylinder being located in the path of the cotton so projected to receive the cotton so doffed, and the space between the extracting cylinders being wide enough to cause the trash to fall out through the vertical space, the doffing cylinder also extending adjacent the periphery of the other extracting cylinder at a point thereon above the aforesaid lower part thereof, to doff the lint off the second extractor cylinder, the second extracting cylinder having its axis higher than that of the first, so that the two are in an inclined relationship.

12. A cotton cleaning machine having a doffing cylinder having a center part and portions projecting outwardly therefrom, and first and second extracting cylinders disposed with their axes in parallel relationship and angularly spaced about the periphery of said doffing cylinder so as to be substantially tangent thereto and spaced from the projecting portions of the doffing cylinder a minimum distance for the doffing of cotton therefrom, said extracting cylinders being adapted to rotate in an opposite direction to that of said doffing cylinder and at a slower peripheral speed thereto, and means including said doffing cylinder for directing cotton onto the first of said extracting cylinders, and means including the said doffing cylinder for doffing the cotton from the first extracting cylinder and directing it onto the second extracting cylinder, the two cylinders being spaced apart around the doffing cylinder by such angular distance that the cotton doffed from the first one in a path generally tangential thereto meets the periphery of the second at a point angularly spaced ahead of the tangency point of the second extracting cylinder and the doffing cylinder, there being a space between the two extracting cylinders to permit trash to fall between them.

References Cited in the file of this patent
UNITED STATES PATENTS

| | | |
|---|---|---|
| 1,426,588 | Mitchell | Aug. 22, 1922 |
| 1,690,375 | Mitchell et al. | Nov. 6, 1928 |
| 1,802,614 | Mitchell | Apr. 28, 1931 |
| 1,967,567 | Wallace | July 24, 1934 |
| 1,990,816 | Conrad | Feb. 12, 1935 |